United States Patent Office 2,886,287
Patented May 12, 1959

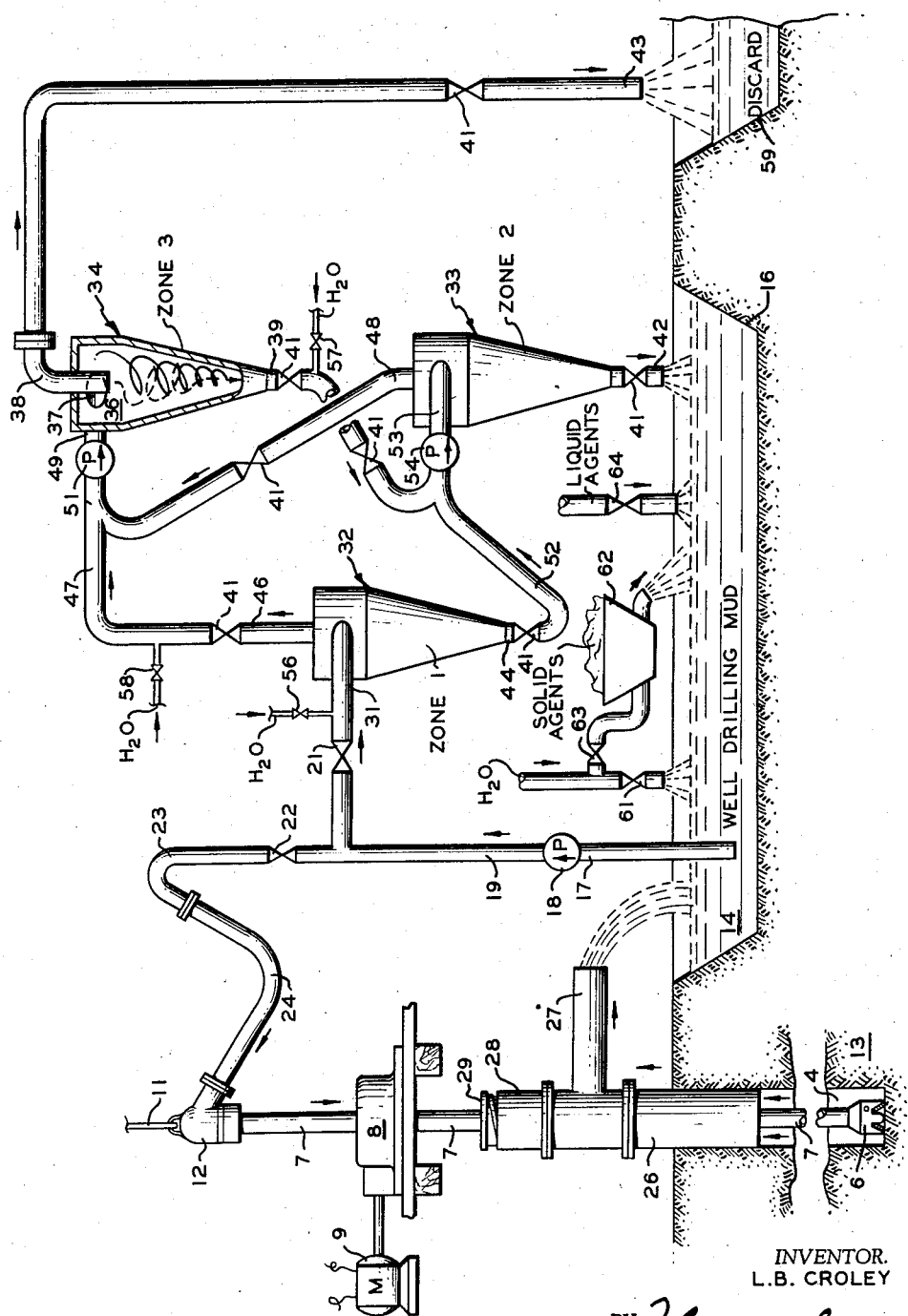

2,886,287

HYDRAULIC CYCLONE SEPARATION SYSTEM

Leo B. Croley, Bartlesville, Okla., assignor to Phillips Petroleum Company, a corporation of Delaware Application July 15, 1957, Serial No. 671,879

8 Claims. (Cl. 255—1)

This invention relates to hydraulic cyclone separation systems and processes involving the same. In one aspect it relates to hydraulic cyclone separation systems and processes in which the overflow and underflow of a first hydraulic cyclone are passed, respectively, to a further hydraulic cyclone separation zone along with the overflow or underflow, respectively, from the other of said further hydraulic cyclone separation zones. In another aspect it relates to apparatus and processes for hydraulic well drilling employing a well drilling mud containing a powdered mineral weighting agent whereby said agent is concentrated in said drilling mud and other materials in said well drilling mud are discarded. In a further aspect it relates to the addition of water to the previously enumerated processes and apparatus.

In the process of concentrating a difficultly separable powdered solid component of a fluid slurry, and in the drilling of wells by hydraulic drilling methods in which such fluid slurries are employed as the drilling mud, it has been found that passing said slurry tangentially into a generally conical chamber with an axial overflow outlet at the base end of the cone and an axial underflow outlet at the apex end of the cone, while maintaining a pressure drop in said slurry in said chamber, results in some concentration of the separable powdered solid component in the underflow. By the term "generally conical" it is intended to include frustroconical, or irregularly tapered chambers having the effect of a cone, such as belled, semi-ellipsoidal, paraboloidal, or hyperboloidal chambers. However, the separation is incomplete and the degree of separation obtained leaves much to be desired. I have found that by substituting the apparatus and processes of the present invention employing at least three hydraulic cyclone separators connected substantially as shown, that a satisfactory and unexpected increase in the concentration of the difficultly separable powdered solid component may easily be obtained. This separation is further enhanced by the addition of water to the feed of each hydraulic cyclone separation zone.

One object of the present invention is to provide improved apparatus and improved processes for concentrating difficultly separable powdered solid components of a fluid slurry.

Another object is to provide the improved processes and apparatus for drilling wells.

A further object is to provide improved processes and apparatus for treating well drilling mud by separating or concentrating certain materials in the same.

Numerous other objects and advantages will be apparent to those skilled in the art upon reading the accompanying specification, claims and drawing, in which the single figure in the drawing shows one specific embodiment of the invention applied to the hydraulic drilling of a well, for illustrative purposes.

In the drawing a well 4 is being drilled by any conventional hydraulic drilling process, such as the conventional rotary drilling process illustrated, in which a rotary drill bit 6 having conventional cutting surfaces is attached to, and rotated by drill string 7, which is rotated by rotary table 8 driven by motor 9. The drill string 7 is fed into well 4 by gravity, by paying out the usual supporting cable 11 connected to drill string 7 by rotary hydraulic swivel 12. Cable 11 is hoisted, or paid out, by the usual draw works (not shown).

In order to cool bit 6, remove cuttings from well 4, seal the walls of the well from passage of fluid into the formation, and maintain sufficient hydrostatic pressure in the well to prevent conate fluids in formation 13 from blowing out of the well, it is conventional to employ a well drilling mud 14, a suitable supply of which is stored in a mud container 16, which may merely be a pit dug in the ground as shown. The well drilling mud 14 may be of any composition known to the prior art, and often comprises water, a powdered mineral weighting agent suspended therein to increase the hydrostatic head in well 4, and may also contain suitable clay, bentonite, water-loss reducing agents and dispersing agents such as alkali metal carboxymethylcellulose, or other ingredients conventionally employed in the prior art. The well drilling mud 14 as it returns from well 4 unavoidably also contains drilling cuttings, sand, and possibly excessive amounts of clay, salt, and/or fluids coming from the formation 13 which are undesirable and tend to build up in the well drilling mud until it becomes difficult to use.

In the prior art, when the well drilling mud becomes difficult to use by such undesired additions from formation 13, it has been customary to discharge large quantities of the same and replace them with fresh desired ingredients. The most expensive ingredient is the powdered mineral weighting agent. Instead of throwing large amounts of the complete drilling mud away, as in the prior art, the present invention concentrates and conserves the more expensive weighting agent, and discards mainly the less expensive and undesirable ingredients which have been added to the mud from formation 13, thus effecting substantial savings in the cost of new drilling mud in the course of drilling.

By powdered mineral weighting agent it is intended to include all such known to the prior art as well drilling mud weighting agents, such as barium sulfate (barite or barytes) $BaSO_4$, the various lead oxides, chiefly litharge PbO and red lead $Pb_3O_4$, the iron oxides, chiefly magnetite $Fe_3O_4$ and hematite $Fe_2O_3$, and powdered iron, lead or other heavy metals and their solid oxides or other water insoluble stable compounds. In practice, barium sulfate is so superior in its reduced relative corrosion of, and abrasiveness to, the well equipment, that it is vastly preferred over the others.

The well drilling mud is drawn from mud container 16 through intake pipe 17 of mud pump 18 and is forced into manifold 19 at a suitable high pressure, which may be several hundred p.s.i.g., or even over 1,000 p.s.i.g. With valve 21 closed and valve 22 open, the drilling mud passes through stand pipe 23, and flexible hose connection 24 into hydraulic swivel 12 from which it proceeds down the hollow drill string 7 and out the usual openings in bit 6 into well 4, where it agitates and picks up the cuttings produced by bit 6 and carries the same up the annular space between drill string 7 and well casing 26, from which it may be returned to mud pit 16 through the usual well casing head 27. Although not essential, it is customary to provide a stuffing box with an adjustable packing gland 29 to prevent uncontrolled flow of drilling mud out of the top of 28 around drill string 7.

While the most usual direction of mud circulation employed in drilling has been shown, it should be realized that it is common in the prior art to use reverse circulation which can be achieved by attaching pipe 23 to pipe 27 and forcing the drilling mud down well 4 and up through drill string 7 with pipe 24 discharging into mud container 16, and obviously the present invention applies equally well to both regular and reverse circulation through well 4 and drill string 7.

In the present invention valve 21 connects manifold 19 to a tangential inlet 31 of a first hydraulic cyclone generally designated as 32, there being three such hydraulic cyclones 32, 33 and 34 each comprising a generally conical chamber 36 (see cyclone 34 which is partly in cross section) with a tangential inlet 37, an axial overflow outlet 38 adjacent the base end of the cone 36, and an axial underflow outlet 39 adjacent the apex end of the cone 36. While not essential in a carefully designed balanced system, it is preferred to control and balance the flow through the various parts of the system by means of conventional valves 41, as this allows more freedom in designing the proportions and sizes of parts.

The system of the present invention comprises the three hydraulic cyclones 32, 33 and 34, although obviously further stages of additional cyclone separators can be added to discharges 42 and 43 in the same manner in which separators 33 and 34 are attached to discharges 44 and 46, all without departing from the present invention. As shown in the drawings, a first manifold 47 connects the overflow outlet 46 of the first cyclone 32 and the overflow outlet 48 of the second cyclone 33 with the tangential inlet 49 of the third cyclone 34 through a pump 51. A second manifold 52 connects the underflow outlet 44 of the first cyclone 32 and the underflow outlet 39 of the third cyclone 34 with the tangential inlet 53 of the second cyclone 33 through a pump 54.

While not essential to the operation of the invention, it has been found that the separation in each of the three cyclones 32, 33 and 34 is facilitated by adding water through valves 56, 57 and 58, respectively, into the tangential feeds 31, 53 and 49, respectively, thereof.

It will be noted in the drawing that the concentrated difficultly separable powdered solid component is returned to the body of drilling mud 14 in mud container 16 through pipe 42, while the less desirable and/or least expensive constituents of the drilling mud 14 are largely separated and discarded into a suitable discard container or pit 59 through pipe 43. This results inevitably in some de-watering of the well drilling mud 14, and in the loss of some of the solid and/or liquid treating agents in well drilling mud 14 if any of the same are employed. If make-up water is not added through valves 56, 57 and 58, it can be added through valve 61 directly into mud container 16. Make-up amounts of lost solid treating agents may be added through hopper 62 by conventional means, such as being washed therefrom by water from valve 63. Make-up liquid agents can be added through valve 64.

In the drawing an illustrative embodiment of the invention has been shown, carrying out the process of drilling a well 4 by hydraulic drilling, comprising the steps of pumping a well drilling mud 14 containing a powdered mineral weighting agent, such as barium sulfate, from a mud container 16 with a pump 18, and circulating a portion in 22 of the same through a drill string 7, while pumping another portion in 21 of said mud through three hydraulic cyclone separation zones 32, 33 and 34; by pumping said drilling mud tangentially at 31 into the first zone 32, pumping the overflow in 46 from the first zone combined with the overflow in 48 from the second zone tangentially through 49 into the third zone 34 by pump 51, pumping the underflow in 44 from the first zone combined with the underflow in 39 from the third zone tangentially through 53 by pump 54 into the second zone 33; and thereby concentrating the weighting agent in the underflow 42 from the second zone 33, while maintaining a pressure drop in said mud across each of said three zones. It is preferred that the pressure drop through each hydraulic cyclone separation zone be at least about 50 and preferably 80 to 200 p.s.i.g., there being no upper limit except that wear on the body of the cone may become excessive at still greater pressure drops. The underflow 42 from the second zone 33 is returned to the mud container 16 while the overflow in 43 from the third zone 34 may be discarded. Water may be added to make up for water lost through valves 56, 57, 58 and/or 61. If desired, solid agents may be added from hopper 62 and liquid agents through valve 64.

EXAMPLE

A well drilling mud consisting of 20 parts water, 2.2 parts clay, and 7.8 parts barium sulfate, having a density of about 11 pounds per gallon, is run through the system shown in the drawing with a pressure drop of about 100 p.s.i.g. across each hydraulic cyclone separation zone. The compositions of the various streams, given in parts, and not percentages, are substantially as follows in Table I:

Table I.—*Example of material balance in the process*

[Composition of streams in parts.]

| Materials | Stream | | | | |
|---|---|---|---|---|---|
| | UNIT #1 | | | | |
| | Pipe 19 to #1 | Pipe 56 to #1 | Feed 31 to #1 | Underflow 52 of #1 | Overflow 46 of #1 |
| H₂O | 20 | 40 | 60 | 10 | 50 |
| Clay | 2.2 | 0 | 2.2 | 0.4 | 1.8 |
| BaSO₄ | 7.8 | 0 | 7.8 | 7 | 0.8 |
| | UNIT #2 | | | | |
| | Pipe 52 to #2 | Pipe 39 to #2 | Pipe 57 to #2 | Feed 53 to #2 | Underflow 42 of #2 | Overflow 48 of #2 |
| H₂O | 10 | 2 | 30 | 42 | 2.8 | 39.2 |
| Clay | 0.4 | 0.4 | 0 | 0.8 | 0.2 | 0.6 |
| BaSO₄ | 7 | 0.8 | 0 | 7.8 | 7.2 | 0.6 |
| | UNIT #3 | | | | |
| | Pipe 46 to #3 | Pipe 48 to #3 | Pipe 58 to #3 | Feed 49 to #3 | Underflow 39 of #3 | Overflow 38 of #3 |
| H₂O | 50 | 39.2 | 0 | 89.2 | 2 | 87.2 |
| Clay | 1.8 | 0.6 | 0 | 2.4 | 0.4 | 2.0 |
| BaSO₄ | 0.8 | 0.6 | 0 | 1.4 | 0.8 | 0.6 |

While no water was added through valve 58 in Table I, in some cases it can be, and in some cases valves 56 and/or 57 can be closed, although in most cases water addition through valve 56 results in quite an improvement in separation.

The complete combination of parts in the drawing shows the invention embodied in a well drilling system; however, it is believed obvious that the parts to the right of valve 21 in the drawing are useful as a subcombination, as apparatus and processes for concentrating any difficultly separable powdered solid component of any fluid slurry. Obviously the invention is not limited to the specific embodiments which have been shown and described for illustrative purposes.

Having described my invention, I claim:

1. Apparatus of the class described comprising in combination a first liquid well drilling mud container, means to draw liquid mud from said container connected to circulate some of said mud through a well drilling string and back into said first container and inject some of said liquid mud tangentially into a first hydraulic cyclone through its tangential inlet, there being three such hydraulic cyclones each comprising a generally conical chamber with a tangential inlet, an axial overflow outlet adjacent the base end of the cone, and an axial underflow outlet adjacent the apex end of the cone, a first manifold connecting the overflow outlets of the first and second cyclones with the tangential inlet of the third cyclone through a pump, a second manifold connecting the underflow outlets of the first and third cyclones with the tangential inlet of the second cyclone through a pump, water supply conduits connected to the tangential inlet to said first cyclone and to said first and second manifolds to add water thereto, and a second discarded mud container, said underflow outlet of said second cyclone being disposed to discharge into said first container, and said overflow outlet of said third cyclone being disposed to discharge into said second container.

2. Apparatus of the class described comprising in combination a first liquid container, means to draw liquid from said container connected to inject some of said liquid tangentially into a first hydraulic cyclone through its tangential inlet, there being three such hydraulic cyclones each comprising a generally conical chamber with a tangential inlet, an axial overflow outlet adjacent the base end of the cone, and an axial underflow outlet adjacent the apex end of the cone, a first manifold connecting the overflow outlets of the first and second cyclones with the tangential inlet of the third cyclone through a pump, a second manifold connecting the underflow outlets of the first and third cyclones with the tangential inlet of the second cyclone through a pump, water supply conduits connected to the tangential inlet to said first cyclone and to said first and second manifolds to add water thereto, and a second discarded mud container, said underflow outlet of said second cyclone being disposed to discharge into said first container, and said overflow outlet of said third cyclone being disposed to discharge into said second container.

3. Apparatus of the class described comprising in combination a first liquid container, means to draw liquid from said container connected to inject some of said liquid tangentially into a first hydraulic cyclone through its tangential inlet, there being three such hydraulic cyclones each comprising a generally conical chamber with a tangential inlet, an axial overflow outlet adjacent the base end of the cone, and an axial underflow outlet adjacent the apex end of the cone, a first manifold connecting the overflow outlets of the first and second cyclones with the tangential inlet of the third cyclone through a pump, a second manifold connecting the underflow outlets of the first and third cyclones with the tangential inlet of the second cyclone through a pump, and a second discarded mud container, said underflow outlet of said second cyclone being disposed to discharge into said first container, and said overflow outlet of said third cyclone being disposed to discharge into said second container.

4. Apparatus of the class described comprising in combination a first liquid well drilling mud container, means to draw liquid mud from said container connected to circulate some of said mud through a well drilling string and back into said first container and inject some of said liquid mud tangentially into a first hydraulic cyclone through its tangential inlet, there being three such hydraulic cyclones each comprising a generally conical chamber with a tangential inlet, an axial overflow outlet adjacent the base end of the cone, and an axial underflow outlet adjacent the apex end of the cone, a first manifold connecting the overflow outlets of the first and second cyclones with the tangential inlet of the third cyclone through a pump, a second manifold connecting the underflow outlets of the first and third cyclones with the tangential inlet of the second cyclone through a pump, and a second discarded mud container, said underflow outlet of said second cyclone being disposed to discharge into said first container, and said overflow outlet of said third cyclone being disposed to discharge into said second container.

5. In a well drilling system the combination comprising first and second mud containers, first, second and third hydraulic cyclone separators, said cyclone separators each comprising a generally conical chamber having a tangential inlet, an axial overflow outlet adjacent the base end of the cone, and an axial underflow outlet adjacent the apex end of the cone, a first and second manifold, a drill string, conduit means, pump means in each of said manifolds and in said conduit means disposed to force liquids therethrough in the direction indicated below, and means to add water to each tangential inlet, said conduit means being disposed to take drilling mud from said first container and pump a portion through said drill string back into said first container and pump another portion into the tangential inlet of said first separator, said first manifold connecting the overflow outlets of said first and second separators with the inlet of said third separator to pump liquid into the latter, said second conduit connecting the underflow outlets of said first and third separators with the inlet of said second separator to pump liquid into the latter, the underflow outlet of said second separator being disposed to discharge into said first container, and the overflow outlet of said third separator being disposed to discharge into said second container.

6. In a well drilling system the combination comprising first and second mud containers, first, second and third hydraulic cyclone separators, said cyclone separators each comprising a generally conical chamber having a tangential inlet, an axial overflow outlet adjacent the base end of the cone, and an axial underflow outlet adjacent the apex end of the cone, a first and second manifold, a drill string, conduit means, pump means in each of said manifolds and in said conduit means disposed to force liquids therethrough in the direction indicated below, said conduit means being disposed to take drilling mud from said first container and pump a portion through said drill string back into said first container and pump another portion into the tangential inlet of said first separator, said first manifold connecting the overflow outlets of said first and second separators with the inlet of said third separator to pump liquid into the latter, said second conduit connecting the underflow outlets of said first and third separators with the inlet of said second separator to pump liquid into the latter, the underflow outlet of said second separator being disposed to discharge into said first container, and the overflow outlet of said third separator being disposed to discharge into said second container.

7. In a separation system the combination comprising first and second mud containers, first, second and third hydraulic cyclone separators, said cyclone separators each comprising a generally conical chamber having a tangential inlet, an axial overflow outlet adjacent the base end of the cone, and an axial underflow outlet adjacent the apex end of the cone, a first and second manifold, conduit means, pump means in each of said manifolds and in said conduit means disposed to force liquids therethrough in the direction indicated below, and means to add water to each tangential inlet, said conduit means being disposed to take drilling mud from said first container and pump a portion into the tangential inlet of said first separator, said first manifold connecting the overflow outlets of said first and second separators with the inlet of said third separator to pump liquid into the latter, said second conduit connecting the underflow outlets of said first and third separators with the inlet of said second separator to pump liquid into the latter, the underflow outlet of said second separator being disposed to discharge into said first container, and the overflow outlet of said third separator being disposed to discharge into said second container.

8. In a separation system the combination comprising first and second mud containers, first, second and third hydraulic cyclone separators, said cyclone separators each comprising a generally conical chamber having a tangential inlet, an axial overflow outlet adjacent the base end of the cone, and an axial underflow outlet adjacent the apex end of the cone, a first and second manifold, conduit means, pump means in each of said manifolds and in said conduit means disposed to force liquids therethrough in the direction indicated below, said conduit means being disposed to take drilling mud from said first container and pump a portion into the tangential inlet of said first separator, said first manifold connecting the overflow outlets of said first and second separators with the inlet of said third separator to pump liquid into the latter, said second conduit connecting the underflow outlets of said first and third separators with the inlet of said second separator to pump liquid into the latter, the underflow outlet of said second separator being disposed to discharge into said first container, and the overflow outlet of said third separator being disposed to discharge into said second container.

References Cited in the file of this patent
UNITED STATES PATENTS

| | | |
|---|---|---|
| 2,225,973 | Brown et al. | Dec. 24, 1940 |
| 2,301,371 | Corwin | Nov. 10, 1942 |
| 2,628,022 | Eckers | Feb. 10, 1953 |